No. 653,020. Patented July 3, 1900.
T. W. FIERS.
SINKER FOR FISH LINES.
(Application filed Apr. 7, 1900.)
(No Model.)
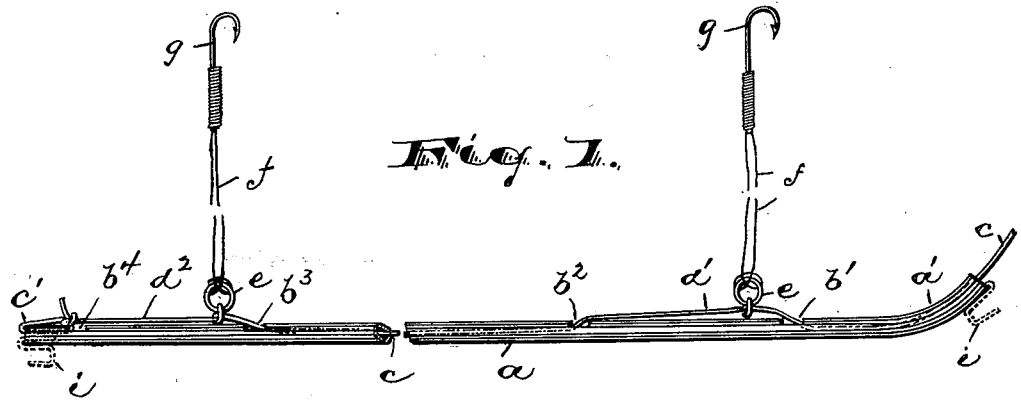
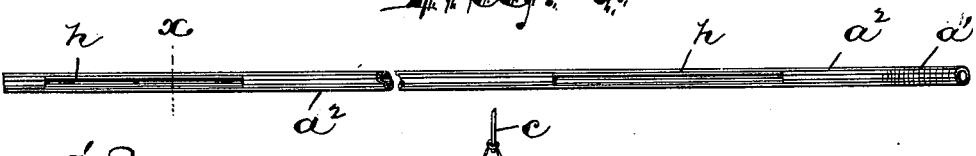
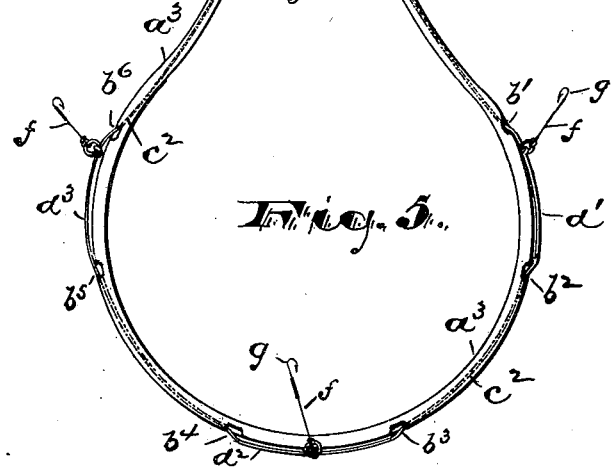
WITNESSES:
INVENTOR:
Thomas W. Fiers,
BY
Drake & Co.
ATTORNEYS
THE NORRIS PETERS CO., PHOTO-LITHO., WASHINGTON, D. C.

UNITED STATES PATENT OFFICE.

THOMAS W. FIERS, OF NEWARK, NEW JERSEY.

SINKER FOR FISH-LINES.

SPECIFICATION forming part of Letters Patent No. 653,020, dated July 3, 1900.

Application filed April 7, 1900. Serial No. 11,924. (No model.)

*To all whom it may concern:*

Be it known that I, THOMAS W. FIERS, a citizen of the United States, residing at Newark, in the county of Essex and State of New Jersey, have invented certain new and useful Improvements in Sinkers for Fish-Lines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a device by which several hooks may be used at one time upon a fish-line without danger of entanglement either with each other or with the main line; to cause said hooks to lie in the water at a distance from the main line, so that the fish will not be impeded or alarmed by said main line; to cause the several hooks to float upward from the bottom of the sea or lake in a natural position, while the main connecting-line lies upon said bottom and is more or less hidden, and to secure other advantages and results, some of which may be referred to hereinafter in connection with the description of the working parts.

The invention consists in the improved sinkers for fish-lines and in the arrangements and combinations of parts of the same, all substantially as will be hereinafter set forth, and finally embraced in the clauses of the claim.

Referring to the accompanying drawings, in which like letters of reference indicate corresponding parts in each of the several views, Figure 1 is a side view of a simple form of my improved device. Fig. 2 is a plan view of a modified form of sinker-tube. Fig. 3 is a cross-section on line $x$, Fig. 2. Fig. 4 shows a wire hook adapted to be inserted in the end of the sinker to wind the line upon, and Fig. 5 is a plan view of a modification of construction.

Heretofore it has been common in fishing, as is well known, to use several hooks attached by leaders or short branch lines to the main fish-line, the said main line being provided with a sinker to carry it to the bottom. In this arrangement, however, the main line stands upright in the water, or nearly so, and the several leaders float upwardly against or around said main line and either become entangled therewith or else lie so close to the main line that access of fish to the hooks is obstructed. My idea is to provide a sinker which will hold the main line laid flat upon the bottom of the sea or lake and allow the baited hooks to float upward therefrom at the ends of their leaders. To this end I employ, preferably, a piece of metal tubing $a$ of sufficient weight to serve as a sinker and being preferably apertured at points along its side, as at $b'$ $b^2$ $b^3$ $b^4$, &c. Through this tube the main fish-line $c$ extends, being threaded in and out through the apertures alternately, so that portions $d'$ $d^2$, &c., of the main line are exposed.

The extremity of the main line is fastened by tying around that portion of the tube between the end aperture $b'$ and the end of the tube, as at $c'$, or in any other suitable manner. At the opposite end of the tube the main fish-line extends up to the hand of the fisherman, this end of the tube being preferably curved slightly, as at $a^t$, to prevent catching upon obstacles when the line is drawn in.

To each of the exposed portions $d'$ $d^2$, &c., of the main line is attached a ring or eye $e$, said ring being fixed to the main line at or near that end of said exposed portion which is nearest the curved or forward end of the sinker. To these rings are attached the usual leaders $f$ and hooks $g$, said rings being of a size which will prevent their being drawn into the tubular passage of the sinker. In use, therefore, the tube $a$ lies on the bottom of the sea or lake and naturally works itself more or less into the mud or sand, so that it is inconspicuous and out of the way, the leaders $f$ floating upwardly in a free and natural position, as though rising from the bottom.

When one of the hooks $g$ is taken by a fish, the pull draws the ring $e$ away from the tube until the next succeeding ring toward the fisherman is brought against the adjacent aperture toward the rear. This necessarily limits the play of line independent of the tube; but by placing the apertures $b'$ $b^2$, &c., in the tube farther apart the amount of play may be increased as desired, and at any rate sufficient play is readily secured without unduly lengthening the tube, as even a very slight pull is distinctly transmitted to the fisherman through the fish-line. After the fish is landed the rod-like sinker may be employed to control him by simply twisting said sinker until the leader is wound up thereon and the nose of the fish brought close to the sinker, so that he has no play. This is especially useful in the case of eels or game fish.

Obviously the sinker-tube may be made of any length to accommodate any desired number of hooks.

Under some conditions the sinker-tube may be slotted, as at $h$, Figs. 2 and 3, to expose the main line for the attachment of branch lines. I may also provide small wire hooks $i$, as shown in Fig. 4, which may be applied to the opposite ends of the sinker in the manner shown in outline in Fig. 1, when said sinker is not in use for fishing and serve as catches upon which to wind the fish-line.

When it is desired to use a large number of hooks, the sinker may be bent into an approximately-circular form $a^3$, as shown in Fig. 5. This occupies less space, and a closed loop $c^2$ at the end of the main fish-line extends around the circular frame, lying loosely within the tubular passage thereof and being of greater circumferential length than the sinker, so as to afford the slackness which permits independent longitudinal movement of the line within the sinker when a fish bites.

A brace $j$ holds the two approaching ends of the sinker $a^3$ rigidly connected.

Various other details of construction may be changed without departing from the broad idea of my invention, and I do not wish to be limited by the foregoing positive description except as the state of the art may require.

Having thus described the invention, what I claim as new is—

1. A sinker for fish-lines, having at intervals of its length means extending around the fish-line and holding the same to itself without preventing independent longitudinal movement thereof, said fish-line having leaders and hooks between said holding means, substantially as set forth.

2. The combination with a fish-line having leaders and hooks thereon, of a sinker engaging said line between the leaders and holding said line normally in line with the sinker without preventing independent longitudinal movement, substantially as set forth.

3. A sinker for fish-lines adapted to loosely surround alternate portions of the line and expose the intermediate portions, whereby the said line is held closely adjacent to the sinker, but limited independent movement is permitted, substantially as set forth.

4. A sinker for fish-lines which engages alternate points on the line and leaves intermediate parts exposed and capable of being drawn outwardly away from the sinker, substantially as set forth.

5. The herein-described sinker for fish-lines, comprising a long body portion adapted to loosely grasp the line at intervals and being free from said line at intermediate portions and permitting limited independent movement of the line and sinker, substantially as set forth.

6. A sinker for fish-lines comprising a tube having independent openings along its side through which a fish-line may be threaded, substantially as set forth.

7. The combination of a tubular sinker having openings along its side, a fish-line threaded through said sinker, leaders attached to the exposed portions of said lines, and hooks on said leaders, substantially as set forth.

8. The combination with a fish-line, of a tubular sinker up-curved at one end and having means at the other for fastening the line, said sinker having openings along its side and the fish-line being threaded through said tubular sinker and having leaders projecting from its exposed portions, substantially as set forth.

9. The combination of a tubular sinker having openings along its side, a fish-line threaded through said sinker and having alternate exposed portions, rings or eyes attached to said exposed portions and leaders fastened to said rings, substantially as set forth.

10. The combination of a tubular sinker having openings at its sides, a fish-line threaded through said sinker and having alternate exposed portions and being longitudinally movable in said sinker, and leaders fastened to said exposed portions near one end thereof, substantially as set forth.

In testimony that I claim the foregoing I have hereunto set my hand this 26th day of March, 1900.

THOMAS W. FIERS.

Witnesses:
CHARLES H. PELL,
C. B. PITNEY.